United States Patent [19]

Bullock et al.

[11] Patent Number: 4,823,583
[45] Date of Patent: Apr. 25, 1989

[54] PARTICULATE TRAP

[75] Inventors: Wesley Bullock, Ravenna; William A. Whittenberger, Garrettsville, both of Ohio

[73] Assignee: W. R. Grace & Co.-Conn., New York, N.Y.

[21] Appl. No.: 231,623

[22] Filed: Aug. 10, 1988

Related U.S. Application Data

[63] Continuation of Ser. No. 60,459, Jun. 11, 1987, abandoned.

[51] Int. Cl.$^4$ .................... B21D 13/04; B21D 13/10
[52] U.S. Cl. .................... 72/196; 29/157 R; 428/182; 72/379
[58] Field of Search ............ 72/185, 196, 379; 29/157 R; 428/182–186, 593, 595, 604; 422/180, 181; 493/352, 463; 55/521; 502/527

[56] References Cited

U.S. PATENT DOCUMENTS

| | | | |
|---|---|---|---|
| 2,290,608 | 7/1942 | Evans | 72/196 |
| 2,684,707 | 7/1954 | Getz | 72/196 |
| 2,963,128 | 12/1960 | Rapp | 428/593 |
| 3,351,441 | 11/1967 | Gewiss | 72/379 |
| 4,065,268 | 12/1977 | Betz | 428/595 |
| 4,382,323 | 5/1983 | Chapman et al. | |
| 4,711,009 | 12/1987 | Cornelison et al. | 29/157 R |
| 4,725,411 | 2/1988 | Cornelison | 502/527 |

*Primary Examiner*—Lowell A. Larson
*Attorney, Agent, or Firm*—Steven T. Trinker

[57] ABSTRACT

There is provided a particulate trap for reducing the amount of particulates emanating from the exhaust of an internal combustion engine. The device utilizes a wound or accordion folded corrugated metal strip. The corrugations are characterized by a plurality of isolated projecting geometric configurations, such as a V-shaped chevrons spaced along a straight line extending between the parallel marginal edges of the thin metal strip. The apices of the metal strip pass through the corrugating rolls to place such apices in compression rather than in tension. These devices are not subject to nesting and are effective to remove diesel exhaust particulates.

7 Claims, 1 Drawing Sheet

PARTICULATE TRAP

This is a continuation of application Ser. No. 060,459, filed June 11, 1987, now abandoned.

This invention relates as indicated, to a particulate trap especially adapted for use in the exhaust lines of diesel engines, which are well known for the volumes of particulates they emit into the air. More particularly, this invention relates to wound and folded honeycomb cores especially useful in diesel particulate traps.

BACKGROUND OF THE INVENTION AND PRIOR ART

Since 1970 there has been an increasing demand for honeycomb cores that have structural integrity after operating for periods ranging upwards to 5000 hours in hot, cyclic corrosive atmospheres, such as found in the exhaust of spark-ignited or compression ignited internal combustion engines, e.g., diesel engines and turbines.

Honeycomb cores used in these applications can be coated with catalytic materials and used as catalytic converters. Such as disclosed in my copending application Ser. No. 830,698 filed Feb. 18, 1986, now U.S. Pat. No. 4,711,009, incorporated herein by reference. Alternately, such cores can be coated to resist hot, cyclic corrosion and can serve as diesel-engine particulate traps, recuperators or diffusers.

Metallic honeycomb cores are made either spirally wound or accordion folded. Some of the prior art cores are comprised of alternating flat metal and corrugated metal substrate layers. Alternately, the cores can be made of adjacent layers of corrugated metallic substrate of minimal thickness, e.g., 0.001" to 0.010" (thin metal) and containing a pattern such that nesting of the corrugations in adjacent layers does not take place. For example, a herringbone or sine wave pattern in the substrate will not nest with itself when the substrate is folded back and forth on itself. Furthermore, nesting will not take place when one of a pair of wave-pattern substrates is turned over or turned end for end and wound against the other one of the pair.

In the mass production of honeycomb cores, it is important that nesting does not take place, because if the adjacent corrugations nest together, then the overall size of the core is reduced, which leads to looseness of the core in the containment vessel. This subsequently leads to vibration of unsupported laminations. Vibration of laminations leads to failure of sections of the core and finally to catastrophic failure of the core as a whole.

Further, in the mass production of honeycomb cores it is essential to keep material usage at a minimum, because the substrate material is costly, especially in relation to the cost of the most commonly-used ceramic substrates. Twenty percent less substrate is needed for a given core size if the core construction consists of alternate layers of metallic substrate with patterned corrugations positioned between layers of similarly-formed corrugations but juxtapositioned by 180 degrees, so as not to nest, which is known as "mixed-flow cell construction" or a "mixed flow core".

Mixed-flow cell construction has the further advantage that greater contact is made with molecules of fluids as they pass by and are catalyzed by catalysts carried by the cell-walls in the core, in comparison with straight, annular cells. Particulate trapping is also enhanced with this mode of construction.

While nesting is not an issue with adjacent flat and corrugated substrate laminations, nesting can be a serious problem, for the reasons described above, in the case of mixed-flow cell construction. Nonetheless, mixed-flow construction has, on balance, so many advantages compared with annular cell construction that it is used increasingly for mass-produced honeycomb cores.

James R. Mondt has described a herringbone pattern for a recuperator in U.S. Pat. No. 3,183,963, issued May 18, 1965, "Matrix for Regenerative Heat Exchangers". Chapman has described a herringbone pattern in U.S. Pat. No. 4,318,888, "Wound Foil Structure", which when formed into a core will not nest. Cairns has described in U.S. Pat. No. 4,098,722, "Methods of Fabricating Bodies", a variable-pitch corrugation whereby adjacent faces will not nest.

The corrugated mixed-flow substrate manufacturing process, as well as the design of corrugation geometry and pattern, must be considered in production of honeycomb cores that are expected to endure the rigors of automotive field service.

The most practical means of manufacturing thin, corrugated substrate is to roll-form strips of metal foil through opposing intermeshing helical gears. The design of the teeth in the opposing gears dictates the corrugation-pattern, pitch and amplitude of the corrugations impressed in the substrate. The nature of the pattern in turn dictates the internal stresses in the foil substrate. As the substrate is pulled into the rotating, opposed gears, thinning of the substrate occurs wherever the substrate is in tension, or alternately thickening or bunching, where the substrate is in compression.

It is a principal object of this invention to describe continuouslyformed corrugation-patterns, for use in particle traps, in which there is a pattern-modal-relationship between adjacent laminations that is minimized. A pattern-modal-relationship is the relative degree of pattern-corrugations facing each other in adjacent layers. Pattern-modal-relationship is important, because the particle trap-efficiency of metal honeycomb cores used with diesel engines, can be improved substantially if patterns with a limited pattern-modelrelationship are used, being illustrated in the annexed drawings in FIGS. 1 and 2.

If the pattern-modal-relationship is minimized, then the carbon particles will be trapped broadly across the corrugated surfaces and trap efficiency will be increased. An optimized geometry for particulate traps is shown in FIGS. 1 and 2.

BRIEF STATEMENT OF THE INVENTION

Briefly stated, the present invention is in a method for making a particulate trap and providing for a nonnesting accordion folded corrugated thin metal strip which comprises corrugating said thin metal strip with a longitudinally running series of peaks and grooves by passing said metal strip between corrugating gears, each of said peaks and grooves including a plurality of spaced, longitudinally extending displacements deviating from and returning to a straight line extending between the longitudinal marginal edges of said metal strip and dividing said peaks and grooves into a series of displacements and straight line segments, said straightline segments equalling from about 75% to about 90% of the total width of said metal strip, the deviations projecting in the direction of the leading edge of said metal strip and being the first to contact the mating corrugating gears and being, as a result, in compression. In a preferred embodiment of the invention, the deviations have the configuration of a V-shaped or chevron.

BRIEF DESCRIPTION OF THE DRAWINGS

The invention may be better understood by having reference to the annexed drawings wherein.

DETAILED DESCRIPTION OF THE INVENTION

As indicated above, the invention is concerned with the production of a particulate trap especially suited for internal combustion engines of the compression ignited type, or diesel engines. These engines, particularly when illtuned or under a heavy load suffer from incomplete ignition of the fuel and consequently a large amount of black smoke usually exits through the exhaust. The particulates are composed in the main of incompletely burned hydrocarbon fuel in the form of carbon particles which are generally submicron size. Discharge of these particles, together with unburned hydrocarbons poses an environmental problem. It is a primary object of this invention to provide a trap for the particulates, which trap if properly provided with a catalytic agent on the surface thereof will also serve to aid in the removal of unburned hydrocarbons and other products of combustion which are considered pollutants.

Reference may be had to U.S. Pat. No. 4,711,009 in the name of Richard C. Cornelison et al, which patent is incorporated herein by reference, for details of the production of corrugated thin metal strips for use in fabricating catalyst supports for exhaust systems. The basic procedure therein disclosed may be used in fabricating the particulate traps of the present invention. The principal difference is in the geometric configuration of the corrugating gears. Otherwise, the process is the same. The inclusion of a catalyst is optional in the present case.

Figure 1:
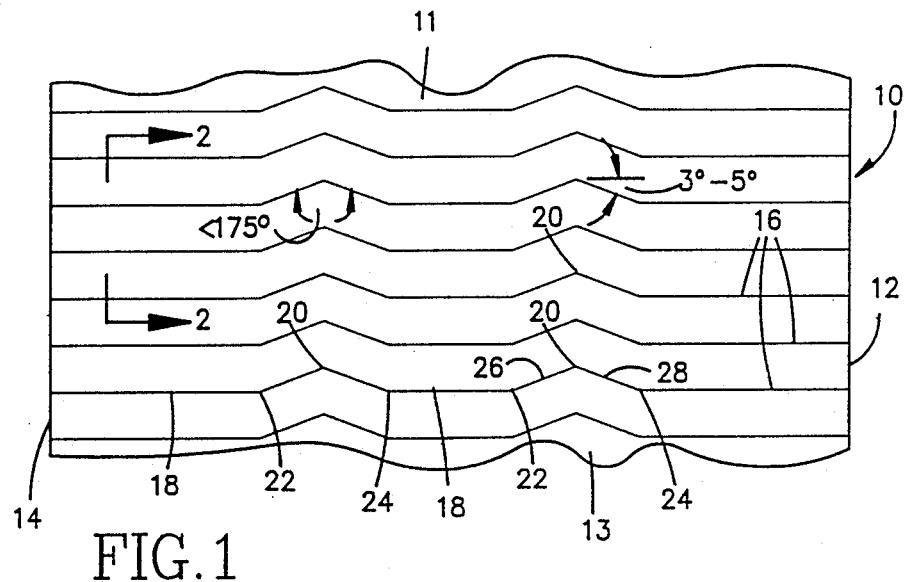
FIG. 1 is a fragmentary diagrammatic plan view of a metal strip having a plurality of isolated V-shaped or chevron type deviations or displacements across the metal strip.
Figure 2:
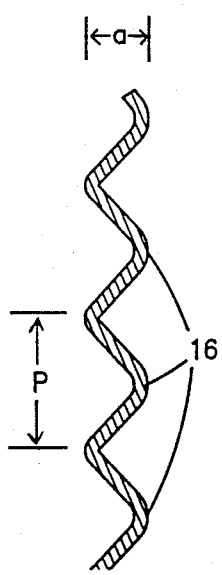
FIG. 2 is a cross-sectional view of the metal strip of FIG. 1 as it appears in the plane indicated by the line 2—2.

Referring now to the annexed drawings, FIG. 1 and 2 show in diagrammatic form a fragment of a metal strip in accordance with the present invention. There is thus shown a portion of a metal strip 10 having parallel marginal edges 12 and 14, a leading portion 11 and a trailing portion 13 with respect to the direction of passage through the corrugating gears. The lines 16 in FIG. 1 represent the peaks of corrugations pressed out of the plane of the metal sheet by passing the planar metal strip through corrugating gears as described in the aforesaid U.S. Pat. No. 4,711,009. The corrugations for most purposes have a pitch, p, from peak to peak of about 2 mm and an altitude, a, of about 1 mm.

Each corrugation as shown in FIG. 1 is composed of a series of straight segments 18 separated by spaced V-shaped chevrons having apices 20, and return apices 22 and 24 where the sides 26 and 28 intersect the segments 18. The segments 18 preferably lie along a straight line, and more preferably, one which is perpendicular to the parallel marginal edges 12 and 14 of the metal strip 10. The angle subtended by the sides 26 and 28 with a horizontal line through the apex 20 is less than 7° and preferably from 3° to 5° as shown in the drawing.

The included angle between the sides 26 and 28 of the chevron is less than about 170°.

The straight segments 18 are relatively large with respect to the chevrons 26-20-28, and in the preferred cases in summation amount to from 75% to 90% of the entire width of the metal strip 10. The displacements, which in the case of FIG. 1 are V-shaped chevrons, are desirably, albeit not essentially, uniformly and evenly spaced along each series of laterally extending segments 18. Such displacements amount to from 10% to 25% of the entire width of the metal strip 10. The displacements in a longitudinal direction from the line of the segments 18 may have any convenient geometric configuration, e.g., semicircular, sinusoidal, truncated triangular, etc. When disposed in the manner aforesaid, such displacements are sufficient to keep the folded or spirally wound corrugated metal strip from nesting and unduly restricting the open area and also provide necessary stability against shifting.

When constructed in the manner aforesaid, particulate traps are especially effective in controlling the amount of unburned particulates escaping from the exhaust line of a diesel engine. Various means for regenerating the trap after it becomes filled are well known. An example of such regneration means is found in U.S. Pat. No. 4,725,411 to which reference may be had.

There has thus been provided a particulate trap for trapping finely divided particulates emanating from the exhaust of compression ignited internal combustion engines. As indicated above, the corrugated surfaces may be provided with a catalyst or catalysts to convert other pollutants to harmless gases or water. The traps hereof are nonnesting because of the presence of intermittant discontinuities in the form of projections or displacements from an otherwise straight line extending between the parallel marginal edges of the metal strip. The projections extend from the strip in the direction of movement of the strip through the corrugating gears, and as pointed out in the applications of Richard C. Cornelison entitled "Corrosion Resistant Corrugated Metal Foil For Use in Wound and Folded Honeycomb Cores" and "Process for Making Obliquely Corrugated Thin Metal Strips" filed on even date herewith as Ser. Nos. 050,412 and 050,413, respectively, are relatively less subject to corrosion because the displacements are in the direction of being under compression because the points 20, for example, enter and leave the corrugating rolls first. The angles at the returns, e.g., 22 and 24, are very wide angles, e.g., 175° and 177°, and hence the degrees of tension imposed by the corrugating rolls at these points are relatively slight and accordingly the susceptibility to corrosion is low.

What is claimed is:

1. A method for making a particulate trap and providing for nonnesting of an accordion folded corrugated thin metal strip which comprises corrugating said thin metal strip with a longitudinally running series of peaks and grooves by passing said metal strip between corrugating gears from a leading edge to a trailing edge, each of said peaks and grooves including a plurality of spaced longitudinally extending displacements deviating from and returning to a straight line extending between the longitudinal marginal edges of said metal strip and dividing each of said peaks and grooves into a series of displacements and alternating straight line segments lying therebetween, the total amount of the straight line segments equalling from about 75% to about 90% of the total width of said metal strip, the displacements extending in the direction of the leading edge of said metal strip and being the first of each peak and groove to contact the mating corrugating gears and being, as a result, in compression.

2. A method as defined in claim 1 wherein the displacements have the configurations of a chevron.

3. A method as defined in claim 2 wherein the included angle of the sides of the chevron is from about 160° to about 175°.

4. A method as defined in claim 1 wherein the displacements are equally spaced along a given straight line extending between the longitudinal marginal edges of said metal strip.

5. A method as defined in claim 4 wherein the given straight line is perpendicular to the longitudinal marginal edges of the metal strip.

6. A method as defined in claim 1 wherein the displacements have the configuration of a sinusoidal segment.

7. A method as defined in claim 1 wherein the displacements have the configuration of a truncated chevron.

* * * * *